3,236,887
HALOGENATED AROMATIC POLYSULFINYL-
AMINES AND THEIR PREPARATION
Haywood Hooks, Jr., West Haven, and Gerhard F. Ott-
mann, Hamden, Conn., assignors to Olin Mathieson
Chemical Corporation, a corporation of Virginia
No Drawing. Filed Aug. 21, 1964, Ser. No 391,316
11 Claims. (Cl. 260—551)

This invention relates to polyhalogenated aromatic N-sulfinylamines, to a process for preparing them, and to a process for preparing polyhalogenated aromatic amines therefrom.

Polyhalogenated aromatic N-sulfinylamines are useful as broad spectrum foliar fungicides and have insect sterilizing properties, as well as nematocidal properties.

Efforts to prepare such compounds previously have been unsuccessful, since chlorinating N-sulfinylamines by previously known processes usually yielded the corresponding amine hydrochlorides.

Polyhalogenated aromatic amines are useful intermediates for the preparation of polyhalogenated aromatic isocyanates which are useful for imparting fire resistance to polyurethanes and polyureas. Efforts to prepare such amines by direct chlorination of aromatic amines are not always successful.

It is a primary object of this invention to provide novel polyhalogenated aromatic N-sulfinylamines.

A further object of the invention is to provide a process for preparing polyhalogenated aromatic N-sulfinylamines.

Another object of this invention is to provide an improved process for preparing polyhalognated aromatic amines.

These and other objects of the invention will be apparent from the following detailed description thereof.

It has now been discovered that the foregoing objects are accomplished by reacting certain aromatic amines with thionyl chlorides to yield the corresponding aromatic N-sulfinylamines, halogenating the resulting N-sulfinylamines in the presence of thionyl chloride, and hydrolyzing the resulting halogenated N-sulfinylamines in a dilute aqueous solution of a highly ionized inorganic compound to yield the corresponding polyhalognated amines.

More in detail, any aromatic amine capable of reacting with thionyl chloride to yield the corresponding aromatic N-sulfinylamine may be employed as a reactant in the novel process of this invention. Suitable aromatic amines are represented by the following formula:

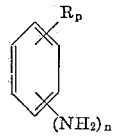

where $n$ is a number in the range between 1 and 3, $p$ is a number in the range between 0 and 1, and R is selected from the group consisting of alkyl containing between about 1 and about 4 carbon atoms and aryl such as phenyl, tolyl, cresyl, and the like. When there are two or more amine groups in the aromatic compound, they are positioned in either the meta or para position and not in the ortho position. Thus, adjoining carbon atoms in the aromatic ring are not substituted with amine substituents.

Examples of suitable aromatic amines which are illustrated by the above formula include aniline, meta-phenylene diamine, para-phenylene diamine, 2,4-toluene diamine, 2,6-toluene diamine, 1,3,5-triamino benzene, mixtures thereof, and the like.

Sufficient thionyl chloride is admixed with the aromatic amine to provide at least the stoichiometric proportion necessary to convert the amine to the corresponding N-sulfinylamine and also to provide a surplus of thionyl chloride which acts as a solvent for the N-sulfinylamine product during the subsequent halogenation step. Satisfactory results are obtained when the total proportion of thionyl chloride is in the range between about 2 and about 10 times the stoichiometric proportion necessary to form the N-sulfinylamine from the aromatic amine.

The reaction between the thionyl chloride and the aromatic amine is moderately exothermic at elevated temperatures. The temperature of the reaction is maintained, by means of an external heat source, in the range between about 45° C. and about 100° C., and preferably in the range between about 50° C. and about 70° C.

The N-sulfinylamine produced in accordance with this technique is represented by the formula:

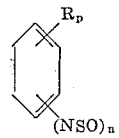

where R, $p$ and $n$ have the same definition disclosed above, and adjoining carbon atoms on the aromatic ring are not substituted with sulfinylamine substituents.

After the reaction is substantially complete, halogenation of the resulting aromatic N-sulfinylamine dissolved in thionyl chloride is effected by admixing the resulting solution with a suitable halogenating agent such as chlorine, bromine, sulfuryl chloride, sulfuryl bromide, mixtures thereof, and the like.

Admixing of the halogenating agent and N-sulfinylamine may be effected by bubbling gaseous halogenating agent through the solution or by adding liquid halogenating agent incrementally to the solution. This reaction is slightly exothermic in the beginning and requires external heating to maintain the temperature of the reaction mass in the range between about 45° C. and about 100° C., and preferably in the range between about 50° C. and about 70° C. Sufficient halogenating agent is contacted with the N-suylfinylamine to substitute at least two halogen atoms on the aromatic ring and preferably enough to effect maximum halogenation thereof. Carrying out the reaction under ultraviolet light enhances maximum halogenation of the aromatic ring.

The product of this reaction is represented by the formula:

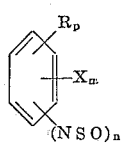

where $n$, $p$, and R have the same definition disclosed above, $m$ is an number in the range between 3 and 5, and X is chlorine, bromine, or mixtures thereof.

The reaction times employed in preparing the N-sulfinyl and halogenated N-sulfinyl compounds vary with proportion of reactants and temperature conditions. Generally, a reaction period between about 1 and about 20 hours may be employed, but greater or shorter periods may be employed if desired.

After complete halogenation is effected, the polyhalogenated N-sulfinylamine formed is separated from the reaction mixture by any convenient technique. For example, the reaction mass is heated in vacuo to facilitate removal of hydrogen chloride which forms as a by-product of the reaction, and of the thionyl chloride solvent. The residue is a polyhalogenated aromatic N-sulfinylamine. In an alternative separation technique, the reaction mixture is cooled and the resulting precipitate of the polyhalogenated sulfinylamine is removed by filtration.

If desired, the polyhalogenated aromatic N-sulfinylamine may be employed as a reactant in the preparation of polyhalogenated aromatic amines by hydrolyzing the polyhalogenated aromatic N-sulfinylamine with a dilute aqueous solution of a highly ionized inorganic compound. Typical examples of suitable highly ionized inorganic compounds include bases such as potassium hydroxide, sodium hydroxide, sodium carbonate, potassium carbonate, mixtures thereof, and the like, and mineral acids such as sulfuric acid, hydrochloric acid, mixtures thereof, and the like.

Concentration of the highly ionized inorganic compound in the dilute aqueous solution is generally in the range between about 5 and about 25 percent by weight, but stronger or more dilute solutions may be used if desired. The proportion of dilute aqueous solution is sufficient to provide at least the stoichiometric proportion of highly ionized compound to effect the formation of the amine corresponding to the polyhalogenated aromatic N-sulfinylamine.

Hydrolysis of the N-sulfinylamine is effected at a temperature in the range between about 0° C. and about 100° C., and preferably between about 20° C. and about 40° C.

Subatmospheric, atmospheric or superatmospheric pressure may be employed since the pressure of the reaction is not critical. The hydrolysis of the N-sulfinylamine is substantially instantaneous if a base is employed, but requires a reaction period of between 1 and 10 hours if an acid is employed.

The product produced in the hydrolysis reaction is represented by the formula:

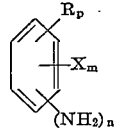

where $n$, $m$, $p$, and X have the meanings described above.

To further illustrate the novel processes of this invention, the following equations illustrate the preparation of 2,3,5,6-tetrachloro p-phenylene diamine from p-phenylene diamine.

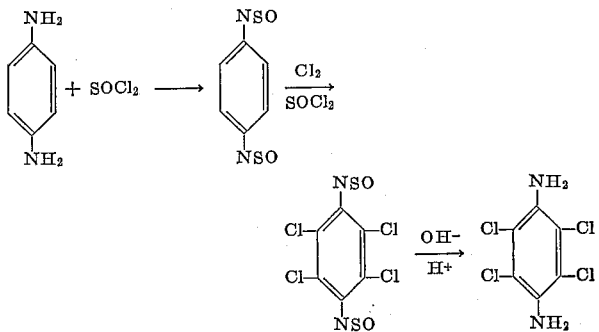

The following examples are presented to define the invention more fully without any intention of being limited thereby.

*Example I*

An amount of 108 g. (1.0 mole) of p-phenylene diamine was added portionwise over a period of 30 min. to 600 ml. (983 g., 8.25 moles) of thionyl chloride with agitation. During the addition, the temperature of the reaction mixture was maintained at 50° to 65° C. by means of an oil bath kept at 50° to 55° C. After stirring for 2 additional hours, an amount of 281 g. (7.92 moles) of chlorine was passed, over a period of 4 hours, into the reaction mixture at 55° to 65° C. while being illuminated by UV light. N,N'-disulfinyl-2,3,5,6-tetrachloro-p-phenylene diamine formed in this reaction separated from the warm reaction mixture in the form of yellow needles. The completion of the chlorination step was indicated by the presence of chlorine in the gas phase. After cooling to 0° C., the precipitate was separated by filtration and purified by recrystallization from carbon tetrachloride affording 216 g. (0.64 mole, 65 percent) of yellow-orange colored N,N'-disulfinyl-2,3,5,6-tetrachloro-p-phenylene diamine, having a melting point of 170–171° C.

*Analysis.*—Calcd. for $C_6Cl_4N_2O_2S_2$: C, 21.3; Cl, 42.0; N, 8.29; S, 18.9. Found: C, 21.6; Cl, 42.2; N, 8.20; S, 18.4.

*Example II*

An amount of 20 g. (0.0542 mole) of N,N'-disulfinyl-2,3,5,6-tetrachloro-p-phenylene diamine was added with stirring to a solution of 19.0 g. (0.47 mole) of NaOH in 110 ml. water. When the exothermic reaction ceased, the mixture was heated for an additional 15 minutes. The precipitate was removed by filtration, washed with water, dried in vacuo (melting point of the crude material was 223–5° C.), and recrystallized from toluene. The yield of 2,3,5,6-tetrachloro-p-phenylene diamine was nearly quantitative and the melting point was 224–5° C.

*Example III*

N,N'-disulfinyl-2,3,5,6-tetrachloro-p-phenylene diamine was refluxed for 2 hours in 10 percent aqueous hydrogen chloride. 2,3,5,6-tetrachloro-p-phenylene diamine was separated in quantitative yield by filtration.

*Example IV*

Amounts of 108 g. (1.0 mole) of p-phenylene diamine and 600 ml. (983 g., 8.25 moles) of thionyl chloride were reacted according to Example I. To this reaction mixture were added 540 g. (8 moles) of sulfuryl chloride dropwise with stirring at a temperature of 55° to 60° C. Heavy evolution of HCl and $SO_2$ took place. After the reaction was complete, $SOCl_2$, HCl and $SO_2$ were removed leaving a solid residue. This residue was recrystallized from $CCl_4$, affording 142 g. (43 percent of the theory) of pure N,N'-disulfinyl-2,3,5,6-tetrachloro-p-phenylene diamine having a melting point of 170–171° C.

*Example V*

An amount of 21.6 g. (0.2 mole) of m-phenylene diamine was added in small increments to 120 ml. (196 g., 1.6 moles) of thionyl chloride with stirring but without external cooling. When the exothermic reaction had ceased, the mixture was stirred for 15 hours at room temperature. Then, the reaction mixture was heated to 60–65° C. while chlorine was passed into it over a period of 6.5 hours at a rate of 9 g. per hour. The precipitate had now dissolved and a dark but clear solution was obtained. After filtration from some solid which had formed upon cooling, thionyl chloride was removed by distillation under atmospheric pressure affording 49 g. (0.16 mole; 80 percent) of crude N,N'-disulfinyl-2,4,6-trichloro-m-phenylene diamine. Distillation in vacuo afforded 39 g. (0.13 mole; 65 percent) of a dark orange colored oil—B.P. 139–141°/0.5 mm.; $n_D^{22}=1.6835$;

which solidified upon standing. Recrystallization from hexane afforded pure N,N'-disulfinyl-2,4,6-trichloro-m-phenylene diamine, M.P. 54–5° C.

Analysis.—Calcd. for $C_6HCl_3N_2O_2S_2$: C, 23.73; H, 0.33; N, 9.23; S, 21.8. Found: C, 23.84; H, 0.5; N, 9.23; S, 20.86.

Example VI

To 50 ml. of 20 percent aqueous sodium hydroxide were added 16 g. (0.053 mole) of N,N'-disulfinyl-2,4,6-trichloro-m-phenylene diamine causing an immediate precipitation of 14 g. of crude 2,4,6-trichloro-m-phenylene diamine which was recrystallized from absolute alcohol affording 10 g. (0.0475 mole; 91 percent) of the pure compound, M.P. 140–141° C.

Example VII

To 400 ml. (655 g.) of thionyl chloride were added 93 g. (1.0 mole) of aniline dropwise and with stirring at 50° to 60° C. The reaction was accompanied by heavy HCl-evolution and formation of a precipitate. After complete addition, the mixture was stirred for an additional 2 hours and then 742 g. of sulfinyl chloride were added over a period of 5 hours while the reaction temperature was maintained at 50°–60° C. After the heavy HCl-evolution had ceased, thionyl chloride was removed from the clear but dark solution by distillation in vacuo, and the resulting oil was allowed to crystallize upon standing over night. The precipitate was separated by filtration, and afforded after recrystallization from n-pentane 130 g. (54 percent of the theory) of pure N-sulfinyl-2,4,6-trichloroaniline, M.P. 52.5–53.5° C.

Various modifiactions of the invention, some of which have been referred to above, may be employed without departing from the spirit of the invention.

What is desired to be secured by Letters Patent is:

1. The process for preparing a polyhalogenated aromatic N-sulfinylamine which comprises reacting an aromatic N-sulfinylamine of the formula:

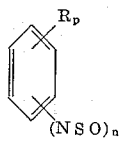

where R is selected from the group consisting of alkyl containing between about 1 and about 4 carbon atoms and aryl selected from the group consisting of phenyl, tolyl and cresyl, where $p$ is a number in the range between 0 and 1, where $n$ is a number in the range between 2 and 3, and where adjoining carbon atoms in the aromatic ring are not substituted with sulfinyl substituents, with a halogenating agent selected from the group consisting of chlorine, bromine, sulfuryl chloride, sulfuryl bromide, and mixtures thereof, in the presence of sufficient thionyl chloride to provide a solvent medium for said N-sulfinylamine reactant, the proportion of said halogenating agent being sufficient to substitute at least two hydrogen atoms of the aromatic ring of said aromatic N-sulfinylamine by halogen atoms and recovering the resulting polyhalogenated aromatic sulfinylamine produced thereby.

2. The process of claim 1 wherein said aromatic N-sulfinylamine is N,N'-disulfinyl-p-phenylene diamine, said halogenating agent is chlorine, and the resulting polyhalogenated aromatic N-sulfinylamine is N,N'-disulfinyl-2,3,5,6-tetrachloro-p-phenylene diamine.

3. The process of claim 1 wherein said aromatic N-sulfinylamine is N,N'-disulfinyl-m-phenylene diamine, said halogenating agent is chlorine, and the resulting polyhalogenated aromatic N-sulfinylamine is N,N'-disulfinyl-2,4,6-trichloro-m-phenylene diamine.

4. The process of claim 1 wherein $n$ is 2.

5. The process for preparing a polyhalogenated aromatic N-sulfinylamine which comprises reacting an aromatic amine of the formula:

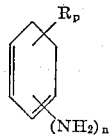

where $n$ is a number in the range between 2 and 3, $p$ is a number in the range between 0 and 1, and R is selected from the group consisting of alkyl containing between about 1 and about 4 carbon atoms and aryl selected from the group consisting of phenyl, tolyl and cresyl, and where adjoining carbon atoms in the aromatic ring are not substituted with amine substituents with thionyl chloride to yield the corresponding N-sulfinylamine in the presence of sufficient thionyl chloride to maintain the resulting N-sulfinyl compound in solution, reacting the resulting solution with sufficient chlorine to effect the substitution of at least two hydrogen atoms of the aromatic ring by chlorine, and recovering the resulting chlorinated N-sulfinyl compound.

6. The process for preparing N,N'-disulfinyl-2,3,5,6-tetrachloro-p-phenylene diamine which comprises reacting para-phenylene diamine with thionyl chloride to yield N,N'-disulfinyl-p-phenylene diamine, in the presence of sufficient thionyl chloride to maintain the resulting disulfinyl compound in solution, reacting the resulting solution with sufficient chlorine to effect the substitution of all hydrogen atoms of the aromatic ring by chlorine, and recovering the N,N'-disulfinyl - 2,3,5,6 - tetrachloro - p-phenylene diamine produced thereby.

7. The process for preparing N,N'-disulfinyl-2,4,6-trichloro-m-phenylene diamine which comprises reacting meta-phenylene diamine with thionyl chloride to yield N,N'-disulfinyl-m-phenylene diamine, in the presence of sufficient thionyl chloride to maintain the resulting disulfinyl compound in solution, reacting the resulting solution with sufficient chlorine to effect the substitution of the hydrogen atoms at the 2, 4 and 6 position of the aromatic ring by chlorine, and recovering N,N'-disulfinyl-2,4,6-trichloro-m-phenylene diamine produced thereby.

8. A compound of the formula:

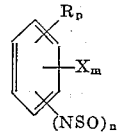

where $n$ is a number in the range between 2 and 3, $p$ is a number in the range between 0 and 1, $m$ is a number between about 2 and about 5, R is selected from the group consisting of alkyl containing between 1 and 4 carbon atoms and aryl selected from the group consisting of phenyl, tolyl and cresyl, where X is selected from the group consisting of chlorine, bromine and mixtures thereof and where adjoining carbon atoms in the aromatic ring are not substituted with sulfinylamine substituents.

9. The compound of claim 8 wherein $n$ is 2.

10.

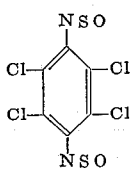

11.

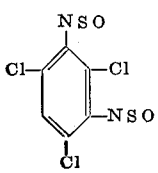

References Cited by the Examiner

Elsevier, Chemistry of Carbon Compounds, Vol. III A, page 182, Elsevier Publishing Co., Amsterdam, Holland (1954).

Houben-Weyl, Methoden der Organischen Chemie, 4th Ed. Band 11/2 (Stickstoff-Verbindungen II/III), pages 738 to 744, Georg Thieme Verlag; Stuttgart, Germany (1958).

Michaelis, Ber. Deut. Chem., Vol. 24, pages 745 to 757 (1891).

Michaelis et al., Der Deut. Chem., Vol. 31, pages 987 and 995–6 (1898).

WALTER A. MODANCE, *Primary Examiner.*

JOHN D. RANDOLPH, HARRY I. MOATZ,
*Assistant Examiners.*